(No Model.)
J. B. SNIDER.
BUSHING.
No. 504,460. Patented Sept. 5, 1893.
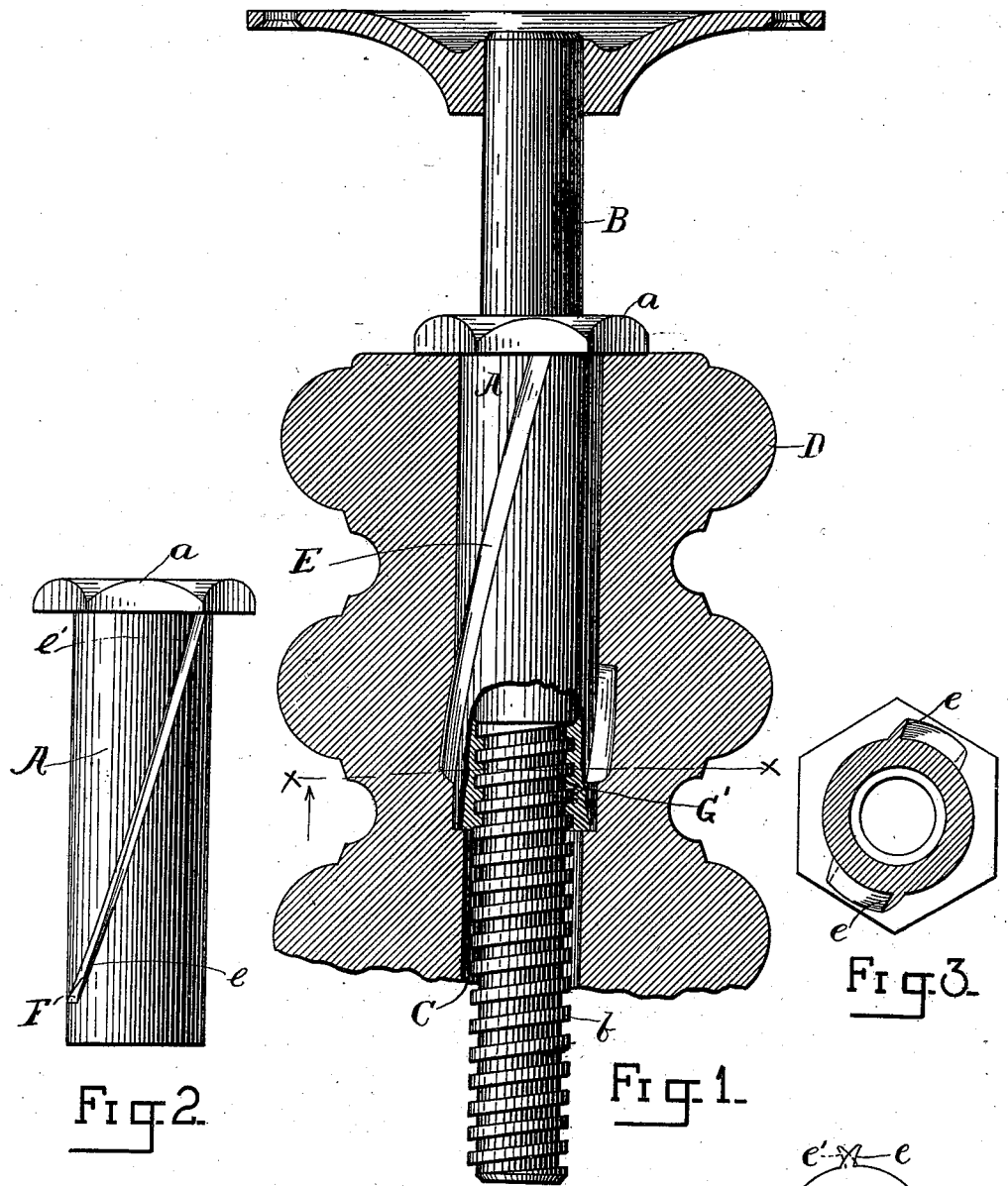
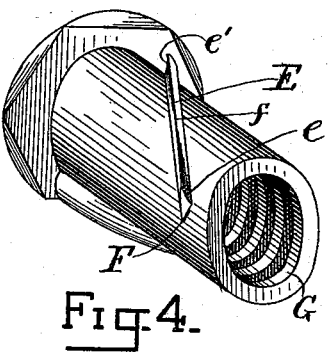
WITNESSES:
Fred W. Hersey.
H. G. Armstrong.
INVENTOR:
James B. Snider
By Charles H. Roberts
his Attorney.

UNITED STATES PATENT OFFICE.

JAMES B. SNIDER, OF CHICAGO, ILLINOIS.

BUSHING.

SPECIFICATION forming part of Letters Patent No. 504,460, dated September 5, 1893.

Application filed December 22, 1892. Serial No. 456,045. (No model.)

*To all whom it may concern:*

Be it known that I, JAMES B. SNIDER, a citizen of the United States, residing at Chicago, in the county of Cook and State of Illinois, have invented a new and useful Improvement in Bushings, of which the following is a specification.

My invention relates to the fastening of bushings, gudgeons, shafts, &c., and particularly to the fastening of the bushings of pianostools, which are subject to great strain and by the common devices cannot be made permanently rigid; and one object of my improvement is to supply a bushing for pianostools which shall hold its position more tenaciously and rigidly; be simpler and more economical than those in present use; which will not split the body or center of the stool when being inserted therein; which can at the same time be more readily and rapidly used and which will be in every way more efficient.

Figure 1 shows a portion of a piano-stool partly in section with the bushing seated in the stem or center and broken away disclosing the thread of the rod and the corresponding thread in the interior of the bushing. Fig. 2 shows a bushing with one of the wings. Fig. 3 is an end view of a section of the bushing taken on a line, $x,x$ cutting Fig. 1 through the lower base of the wing E at the shoulder F and looking toward the head of the bushing. Fig. 4 is an end perspective view looking toward the head of the bushing, illustrating the laying over of the wings and showing the threaded interior of the bushing or nut. Fig. 5 is a diagram showing the position of the diverse points of the wing when embedded in the center.

Similar letters refer to similar parts throughout the several views.

I describe my invention as follows: I make the body of the bushing A, (which has a nut at G to engage with the thread $b$ on the rod B) of a size to fit snugly into a hole C bored in the wooden center or stem D of the stool, and provide the bushing with one or more longitudinal or preferably longitudinally oblique wings E, said wings being slightly laid over diversely—preferably diversely laid over from the center—as most clearly shown in Fig. 4, so that part $e$ of the wing, in an attempt to unscrew the bushing, presents a bit-like and aggressive edge which digs into the wood, and the part $e'$ digs into the wood diversely in a similar way in an attempt to screw the bushing inward. This formation is favorable to the casting of the winged bushing from metal as the laying over of the part $e'$, allows a ready removal of the model from the molding-sand. These wings are preferably two in number, although less or more be used, and they may be placed at about the horizontal inclination with the body of the bushing shown in the drawings, although the inclination may be slightly changed without detracting from the result, the design being to place the wing at such a steep inclination that the bushing cannot be screwed into or unscrewed from the wood by a mere rotating motion like a common screw in resistance to which it is assisted by the bit-like edges of the diversely laid over wings $e$ and $e'$ which hold it from turning either way.

In operation the bushing is first inserted in the hole C until the shoulder F of the wing rests on the body of the stem or center. The bushing can then be forced into place by blows or downward pressure. As the bushing descends into the center under the impact or force of the blows or pressure, the wings E cut their own way, and when the bushing is forced home in the center D the wings are embedded and wedged in the stem or center as shown in Fig. 1, the wedging being effected as follows: As the wings enter the stem, cutting their way, the laid over portion $e$ cuts a laid over groove of its own conformation, but when it has entered part way, the portion $e'$ follows and as this is laid over the diverse way, it cannot follow in the groove made by $e$, not being the same shape, but tends to cut a diverse way for itself and put a strain upon the wood at $e$, so that a strain is exerted against the groove in the wood by both laid over portions, which rest in a self-created dove-tailed groove when the bushing is driven home; the part $e$ presenting its biting edge against the wood one way, and $e'$ presenting its edge in the groove the diverse way, as shown in Fig. 5; and the groove is thus forced open by the wing, which in turn is clutched by the expanded groove. Thus the wing is held, when seated, by several contributing agencies; the forcing of the diversely laid over wing wedges it in the wood; it makes for itself a dove-tail-like groove; and in this the parts e and e' act as dogs facing diverse ways and by biting into the wood or material hold it tenaciously and the spring of the diversely parted material also clutches and holds the wing at both ends. The wings E when diversely laid over may be made vertical or of a different inclination but are preferably constructed of the inclination shown in the drawings.

It is obvious that this device may also be used on shafts, journals or spindles, or similar centers which require to be driven or forced into place. The part e' need not be laid over so much as the part e, and it will be sufficient if the portion of the wing following e stands at such a diverse angle from e as to put a strain upon the wing and its groove.

I do not claim the bushing and nut broadly, for they are old, but

What I claim as my invention, and desire to secure by Letters Patent, is—

In a bushing, gudgeon, or other shaft, adapted to be driven or otherwise forced into place, a wing formed thereon, said wing partially encircling the bushing, gudgeon, or shaft and being oppositely laid over at some point in its length, and in cross section to the axis of said bushing, gudgeon, or shaft.

In testimony whereof I affix my signature in presence of two witnesses.

JAMES B. SNIDER.

Witnesses:
   JOHN J. AMES,
   ALEXANDER J. INNES.